United States Patent [19]

Edwards et al.

[11] Patent Number: 5,068,489

[45] Date of Patent: Nov. 26, 1991

[54] PREPARATION OF VERY LOW MOLECULAR WEIGHT POLYETHYLENE IN A FLUIDIZED BED

[75] Inventors: David N. Edwards, Charleston, W. Va.; Robert J. Jorgensen, Belle Mead, N.J.; Kiu H. Lee, South Charleston; Arthur E. Marcinkowsky, Charleston, both of W. Va.

[73] Assignee: Union Carbide Chemicals and Plastics Technology Corporation, Danbury, Conn.

[21] Appl. No.: 458,390

[22] Filed: Dec. 28, 1989

[51] Int. Cl.$^5$ .............................................. C07C 2/02
[52] U.S. Cl. ................................ 585/524; 502/114; 526/905
[58] Field of Search ........................................ 585/524

[56] References Cited

U.S. PATENT DOCUMENTS 4,302,565 11/1981 Goeke et al. ........................ 526/88
4,302,566 11/1981 Karol et al. ........................ 526/125

FOREIGN PATENT DOCUMENTS 0120503 10/1984 European Pat. Off. .

OTHER PUBLICATIONS

S. Lin, J. Chen and Y. Lu, *Geo Fen Zi Xun* (Polymer Communications), No. 5, pp. 326-331, Oct. 1986, Institute of Polymer Science, Zhongshen University, Guang Zhou.

*Primary Examiner*—Patrick P. Garvin
*Assistant Examiner*—E. D. Irzinski
*Attorney, Agent, or Firm*—John S. Piscitello

[57] ABSTRACT

Ethylene copolymers having a very low molecular weight are continuously prepared in a fluidized bed in the presence of reduced concentrations of hydrogen, at improved catalyst activity and polymer productivity, by effecting polymerization in the presence of a dialkylzinc compound.

61 Claims, No Drawings

PREPARATION OF VERY LOW MOLECULAR WEIGHT POLYETHYLENE IN A FLUIDIZED BED

FIELD OF THE INVENTION

This invention relates to a process for preparing very low molecular weight ethylene copolymers in a fluidized bed. More particularly, this invention relates to a fluidized bed process for preparing ethylene copolymers having a melt index of from about 500 g/10 minutes to about 2500 g/10 minutes.

BACKGROUND OF THE INVENTION

The low molecular weight polyethylene market is spanned by products having molecular weights varying from just a few hundred to several thousand. Polymers having weight average molecular weights of from about 2,000 to about 4,000 are generally classified as waxes, while polymers having weight average molecular weights of from about 4,000 to about 14,000 are generally classified as wax-resins. The waxes have melt indices varying from about 1000 g/10 minutes to about 2500 g/10 minutes, while the wax-resins have melt indices varying from about 500 g/10 minutes to about 1000 g/10 minutes.

Polyethylene waxes and wax-resins are conventionally prepared by the high pressure (>100,000 kPa) homopolymerization of ethylene in stirred and elongated tubular reactors in the absence of solvent using free radical initiators. However, the elevated pressure required to produce these low molecular weight materials by this technique necessitates a high level of energy consumption which materially affects the manufacturing cost of these products.

Gas-phase, fluidized bed processes, such as described in U.S. Pat. Nos. 4,302,565 and 4,302,566, are well known cost effective methods of producing high modulus, high molecular weight ethylene copolymers having a density of from 0.91 g/cm$^3$ to 0.96 g/cm$^3$. However, such processes have not heretofore been employed to produce very low molecular weight products such as waxes and wax-resins. The reason for this is that low molecular weight materials of this type have low sintering temperatures which causes the polymer particles to soften and stick together at the reactor temperatures normally employed in fluidized bed polymerizations. As a result of this particle agglomeration, fluidization soon ceases and polymerization comes to a halt due to reactor fouling.

European patent 0 120 053 discloses that low modulus ethylene copolymers having a density of less than 0.91 g/cm$^3$ can be prepared in gas phase in a fluidized bed provided that a large volume of a diluent gas is present in the reaction mixture. According to this reference, hydrogen may be employed as a diluent gas in a mol ratio of hydrogen to ethylene of from 0.01:1 to 0.5:1. In this process, the hydrogen acts not only as a diluent, but also as a chain transfer agent to regulate the molecular weight of the copolymers produced by the process. Copolymers having a melt index of from greater than 0 g/10 minutes to about 25 g/10 minutes are produced by the process.

Attempts have been made to produce very low molecular weight waxes and wax-resins in a fluidized bed by modifying the procedure of European patent 0 120 053, e.g., by increasing the concentration of hydrogen in the reactor. Hydrogen, of course, is a well known chain transfer agent and is frequently employed in ethylene polymerizations to control molecular weight. However, it has been found that catalyst activity is adversely affected at the high concentrations of hydrogen required to produce the desired products (at least 60 mol percent hydrogen in the reaction mixture), and if the concentration of hydrogen exceeds 50 mol percent, catalyst activity virtually ceases and polymerization in effect comes to a halt.

Copending U.S. application Ser. No. 458,343 of M. C. Hwu et al., filed Dec. 28, 1989, discloses that ethylene can be successfully polymerized with at least one higher alpha-olefin in a fluidized bed in the presence of high concentrations of hydrogen to produce ethylene copolymers having a melt index of from about 500 g/10 minutes to about 2500 g/10 minutes, while still maintaining satisfactory catalyst activity, provided that polymerization is first effected in the presence of a hydrogen concentration of less than 50 mol percent before the hydrogen concentration is increased to the level required to produce the desired products.

S. Lin, J. Chen and Y. Lu have disclosed (Kinetic Study Of Supported Catalytic Ethylene Polymerization With The Effect Of Diethyl Zinc On Catalyst Efficiency And Regulation Of The Molecular Weight. *Gao Fen Zi Tong Xun (Polymer Communications)*, No. 5, pg. 326–331, October, 1986. Institute Of Polymer Science, Zhongshen University, Guang Zhou) that diethylzinc can be employed to regulate the molecular weight of polyethylene and to increase the efficiency of a TiCl$_4$/MgCl$_2$/Al(C$_2$H$_5$)$_3$ catalyst prepared by grinding. However, no hydrogen was employed in the reaction system and no very low molecular weight polymers were produced in this manner.

SUMMARY OF THE INVENTION

In accordance with the present invention it has now been discovered that ethylene can be continuously polymerized with at least one higher alpha-olefin in a fluidized bed in the presence of reduced concentrations of hydrogen to produce ethylene copolymers having a melt index of from about 500 g/10 minutes to about 2500 g/10 minutes, at improved levels of catalyst activity and polymer productivity, provided that polymerization is conducted in the presence of a dialkylzinc compound.

Thus, the present invention provides a process for continuously producing ethylene copolymers having a melt index of from about 500 g/10 minutes to about 2500 g/10 minutes at high levels of catalyst activity and polymer productivity which comprises copolymerizing ethylene and at least one higher alpha-olefin, by continuously contacting, in a fluidized bed, at a temperature of from 10° C. up to 110° C. and a pressure no greater than 7,000 kPa, a gaseous mixture containing
 (a) ethylene and at least one higher alpha-olefin in a molar ratio of such higher alpha-olefin to ethylene of from 0.01:1 to 2:1, and
 (b) from 30 mol percent to 90 mol percent hydrogen, with
 (I) a catalyst composition prepared by (i) forming a precursor composition from a magnesium compound, titanium compound, and electron donor compound; (ii) diluting said precursor composition with an inert carrier; and (iii) activating the diluted precursor composition with an organoaluminum compound; and
 (II) a dialkylzinc compound.

DETAILED DESCRIPTION OF THE INVENTION

Fluidized bed reactors suitable for continuously preparing ethylene copolymers have been previously described and are well known in the art. Fluidized bed reactors useful for this purpose are described, e.g., in U.S. Pat. Nos. 4,302,565 and 4,302,566, the disclosures of which are incorporated herein by reference.

In order to produce ethylene copolymers having a melt index of from about 500 g/10 minutes to about 2500 g/10 minutes, it has previously been found necessary for the gaseous reaction mixture present in the polymerization reactor to contain at least 60 mol percent hydrogen. Ordinarily, however, as the concentration of hydrogen in the reactor increases, the rate of polymerization declines, and finally, at the hydrogen concentration levels required to produce the desired polymers, polymerization ceases completely. This effect is due both to (i) lowered ethylene partial pressure in the reactor and (ii) deactivation of the catalyst by the hydrogen as the hydrogen partial pressure increases. Surprisingly, however, it has recently been reported by M. C. Hwu et al., supra, that the desired polymers can be produced in high yields at satisfactory polymerization rates, in spite of the presence of hydrogen concentrations in excess of 60 mol percent in the reactor, if polymerization is first effected in the presence of less than 50 mol percent hydrogen before the hydrogen concentration is increased to the desired level of in excess of 60 mol percent. And now, in accordance with the present invention, it has been discovered that such two-stage polymerization can be eliminated, and catalyst activity and polymer productivity can be further enhanced, if polymerization is conducted in the presence of a dialkylzinc compound. Such compounds evidently act to minimize the de-activating effect which hydrogen exerts on the catalyst, and thereby serve to increase polymer productivity. Further, because dialkylzinc compounds act as chain transfer agents in addition to activity promoters, it is possible to produce the desired low molecular weight polymers in the presence of reduced concentrations of hydrogen.

The hydrogen employed in the process of the invention not only serves to reduce the molecular weight of the polymers produced by acting as a chain transfer agent, but also acts as a diluent gas which helps reduce the tackiness of the polymer particles and their tendency to agglomerate. In order to produce the desired copolymers, the gaseous mixture present in the reactor must contain at least 30 mol percent hydrogen. This concentration of hydrogen is necessary not only to reduce the molecular weight of the copolymers to the desired level, but also to prevent agglomeration of polymer particles and consequent fouling of the reactor. However, because of the presence of dialkylzinc in the reactor, it is possible to produce such copolymers in the presence of less than 60 mol percent hydrogen, and without a two-stage polymerization. If desired, however, hydrogen concentrations up to 90 mol percent can be tolerated. Preferably, the reaction mixture contains from 40 to 75 mol percent hydrogen, but most preferably less than 60 mol percent hydrogen. Generally the reaction mixture contains ethylene in an amount sufficient to produce a hydrogen to ethylene mol ratio of from 2.5:1 to 18:1, preferably from 3.5:1 to 11:1.

The dialkylzinc compounds employed in the process of the present invention can be illustrated by the formula $$ZnRR'$$

wherein R and R' are alkyl radicals, which radicals may be the same or different. Generally R and R' are alkyl radicals containing from 1 to 12 carbon atoms, usually from 1 to 6 carbon atoms. Such radicals may be cyclic, branched or straight chain, and may be substituted with one or more substituents which are nonreactive with all the components of the catalyst system as well as all the components of the reaction system. Illustrative of such radicals are methyl, ethyl, n-propyl, isopropyl, n-butyl, tert-butyl, n-hexyl, n-decyl, and the like.

The dialkylzinc compounds can be used individually or in combination thereof, and include compounds such as diethylzinc, diisobutylzinc, and di-n-decylzinc. Diethylzinc is particularily preferred.

The higher alpha-olefin employed to copolymerize with ethylene to produce the copolymers of the present invention plays an important role in determining the properties of such copolymers. Thus, for example, as the amount of higher alpha-olefin which copolymerizes with ethylene increases, copolymers having progressively lower densities are obtained at any given melt index. The amount of higher olefin needed to produce copolymers of a given density will vary from olefin to olefin, under the same conditions, with larger amounts of olefin required as the number of carbon atoms in the olefin decreases.

The higher alpha-olefin employed to copolymerize with ethylene also affects the molecular weight of the copolymers produced, with higher melt indices being obtained as the concentration of comonomer in the polymer increases. Polymer production also increases in the presence of comonomer.

The higher alpha-olefin which is copolymerized with ethylene to produce the low molecular weight copolymers of the present invention may be present in the gaseous reaction mixture in an amount sufficient to provide a molar ratio of higher olefin to ethylene of from 0.01:1 to 2:1, preferably from 0.05:1 to 1:1. Such ratios will produce copolymers having a density of from 0.88 g/cm$^3$ to 0.96 g/cm$^3$.

The higher alpha-olefins which can be polymerized with ethylene to produce the low molecular weight copolymers of the present invention can contain from 3 to 8 carbon atoms. These alpha-olefins should not contain and branching on any of their carbon atoms closer than two carbon atoms removed from the double bond. Suitable alpha-olefins include propylene, butene-1, pentene-1, hexene-1, 4-methylpentene-1, heptene-1 and octene-1. The preferred alpha-olefins are propylene, butene-1, hexene-1, 4-methylpentene-1 and octene-1.

In addition to hydrogen, ethylene, and at least one higher alpha-olefin, the reaction mixture may also contain from 10 to 40 mol percent of an inert gas. By an "inert" gas is meant a gas which is nonreactive under the conditions employed during polymerization, i.e., does not decompose and/or react with the polymerizable monomers or other components of the reaction system under the polymerization conditions employed in the reactor. In addition such gas should be insoluble in the polymer product produced so as not to contribute to polymer tackiness. Among such gases are nitrogen, argon, helium, methane, ethane, and the like.

The gaseous reaction mixture should, of course, be substantially free of catalyst poisons, such as moisture, oxygen, carbon monoxide, carbon dioxide, acetylene and the like.

In order to prevent polymer agglomeration, it is, of course, necessary to conduct polymerization at a temperature below the sintering temperature of the polymer product. Since the sintering temperature decreases along with the molecular weight of the product, the greater the concentration of hydrogen and dialkylzinc employed in the reactor, the lower the reaction temperature must be in order to prevent agglomeration. On the other hand, the temperature employed must be sufficiently elevated to prevent substantial condensation of the reaction mixture to the liquid state, as such condensation will cause the polymer particles being produced to cohere to each other and likewise aggravate the polymer agglomeration problem. This difficulty is normally associated with the use of alpha-olefins having 5 or more carbon atoms which have relatively high dew points. While some minor condensation is tolerable, anything beyond this will cause reactor fouling. Generally, in order to continuously produce the desired polymers while preventing polymer agglomeration, the temperature must not be permitted to rise above 110° C. Usually temperatures of from 10° C. to 100° C. are employed, depending upon the particular comonomer employed, the concentration of such comonomer in the reactor, and the molecular weight of the polymer product. Temperatures above 100° C. should be avoided when the hydrogen concentration in the reaction mixture exceeds 60 mol percent.

Pressures of up to about 7000 kPa can be employed in the process. Pressures of from about 70 kPa to 2500 kPa are preferred.

In order to maintain a viable fluidized bed, the superficial gas velocity of the gaseous reaction mixture through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

The catalyst compositions employed in the process of the present invention are produced by (i) forming a precursor composition from a magnesium compound, titanium compound, and electron donor compound; (ii) diluting said precursor composition with an inert carrier; and (iii) activating the diluted precursor composition with an organoaluminum compound.

The precursor composition is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrent therewith. Dissolution of the titanium compound(s) and the magnesium compound(s) in the election donor compound(s) can be facilitated by stirring, and in some instances by refluxing, these two compounds in the electron donor compound(s). After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, preferably about 1 mol to about 10 mols, of the magnesium compound(s) are used per mol of the titanium compound(s) in preparing the precursor composition.

The titanium compound(s) employed in preparing the precursor composition has the structure $Ti(OR'')_a X_b$ 

wherein R'' is an aliphatic or aromatic hydrocarbon radical containing from 1 to 14 carbons atoms, or COR''' where R''' is an aliphatic or aromatic hydrocarbon radical containing from 1 to 14 carbon atoms, X is selected from the group consisting of Cl, Br, I, and mixtures thereof, a is 0, 1 or 2, b is 1 to 4 inclusive, and a +b=3 or 4.

R'' and R''' may be substituted with one or more substituents which are inert under the reaction conditions employed during preparation of and polymerization with the precursor composition. When R'' and R''' are aliphatic, they may be cyclic, branched or straight chain.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$. $TiCl_3$ is preferred because catalysts containing this material show higher activity at the high hydrogen concentrations employed in the process of the present invention. In addition, limited ethylene hydrogenation occurs in the presence of $TiCl_3$ compared to other titanium materials.

The magnesium compound(s) employed in preparing the precursor composition has the structure $MgX_2$ 

wherein X is selected from the group consisting of Cl, Br, I, and mixtures thereof.

Suitable magnesium compounds include $MgCl_2$, $MgBr_2$ and $MgI_2$. Anhydrous $MgCl_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include alkyl esters of aliphatic and aromatic carboxylic acids, aliphatic ethers, cycloaliphatic ethers and aliphatic ketones. Particularly useful are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cycloaliphatic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred electron donor is tetrahydrofuran. If desired, these electron donor compounds may be substituted with one or more substituents which are inert under the reaction conditions employed during preparation of and polymerization with the precursor composition.

After the precursor composition has been prepared it is diluted with an inert carrier material by (1) mechanically mixing or (2) impregnating such composition into the carrier material.

Mechanical mixing of the inert carrier and precursor composition is effected by blending these materials together using conventional techniques. The blended mixture suitably contains from about 3 percent by weight to about 50 percent by weight of the precursor composition.

Impregnation of the inert carrier material with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

The blended or impregnated precursor composition prepared as disclosed herein has the formula $$Mg_mTi(OR'')_nX_p[ED]_q$$

wherein R'' is an aliphatic or aromatic hydrocarbon radical containing from 1 to 14 carbon atoms, or COR''' wherein R''' is also an aliphatic or aromatic hydrocarbon radical containing from 1 to 14 carbon atoms, X is selected from the group consisting of Cl, Br, I, and mixtures thereof, ED is an electron donor compound, m is 0.5 to 56, preferably 1.5 to 5, n is 0, 1 or 2, p is 2 to 116, preferably 6 to 14, and q is 2 to 85, preferably 3 to 10.

Suitably, the impregnated carrier material contains from about 3 percent by weight to about 50 percent by weight, preferably from about 10 percent by weight to about 30 percent by weight, of the precursor composition.

The carrier materials employed to dilute the precursor composition are solid, particulate, porous materials which are inert to the other components of the catalyst composition, and to the other active components of the reaction system. Suitable carrier materials include inorganic materials such as oxides of silicon and/or aluminum. Usually these materials have an average particle size of from about 10 microns to about 250 microns, preferably from about 20 microns to about 150 microns, and a surface area of at least 3 square meters per gram, preferably at least 50 square meters per gram. Polymerization activity of the catalyst can be improved by employing a silica support having an average pore size of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support. Alternatively, when silica is employed, it may be dried at a temperature of at least 200° C. and treated with about 1 weight percent to about 8 weight percent of one or more of the aluminum activator compounds described below. Modification of the support with an aluminum compound in this manner increases catalyst activity and improves polymer morphology of the resulting ethylene copolymers. Other organometallic compounds, such as diethylzinc, may also be used to modify the support.

To be useful in producing ethylene copolymers, the precursor composition must be activated with a compound capable of transforming the titanium atoms in the precursor composition to a state which will cause ethylene to effectively copolymerize with higher alpha olefins. Such activation is effected by means of an organoaluminum compound having the structure $$Al(R'''')_dX'_eH_f$$

wherein X' is Cl or OR''''',

R'''' and R''''' are saturated hydrocarbon radicals containing from 1 to 14 carbon atoms, which radicals may be the same or different, e is 0 to 1.5, f is 0 or 1, and d+e+f=3.

R'''' and R''''' may be substituted with one or more substituents which are inert under the reaction conditions employed during polymerization. Preferably R'''' and R''''' are alkyl radicals containing from 1 to 8 carbon atoms.

Such activator compounds can be employed individually or in combination thereof and include compounds such as $Al(C_2H_5)_3$, $Al(C_2H_5)_2Cl$, $Al_2(C_2H_5)_3Cl_3$, $Al(C_2H_5)_3$, $Al(C_2H_5)_2)Cl$, $Al(i-C_4H_9)_3$, $Al(i-C_4H_9)_2H$, $Al(C_6H_{13})_3$ and $Al(C_8H_{17})_3$.

If desired, the precursor composition may be partially activated before it is introduced into the polymerization reactor. However, any activation undertaken outside of the polymerization reactor should be limited to the addition of an amount of activator compound which does not raise the molar ratio of activator compound:electron donor in the precursor composition beyond 0.5:1, as higher ratios have been found to substantially lower catalyst activity. In order to maintain maximum catalyst activity, the activator compound is preferably employed in an amount which will provide the precursor composition with an activator compound:electron donor molar ratio of from about 0.1:1 to about 0.3:1. Such partial activation is carried out in a hydrocarbon solvent slurry followed by drying of the resulting mixture, to remove the solvent, at temperatures of from about 20° C. to about 80° C., preferably from about 50° C. to about 70° C. The resulting product is a free-flowing solid particulate material which can be readily fed to the polymerization reactor where the activation is completed with additional activator compound which can be the same or a different compound.

Alternatively, when an impregnated precursor composition is employed, it may, if desired, be completely activated in the polymerization reactor without any prior activation outside of the reactor, in the manner described in U.S. Pat. No. 4,383,095.

During the continuous gas phase fluidized bed polymerization disclosed herein, discrete portions of the partially activated or totally unactivated precursor composition are continually fed to the reactor, along with discrete portions of the activator compound necessary to complete the activation of the partially activated or totally unactivated precursor composition, in order to replace active catalyst sites that are expended during the course of the reaction. Discrete portions of the dialkylzinc compound are also continually fed to the reactor in order to minimize the de-activating effect which the high concentration of hydrogen exerts on the catalyst, thereby enhancing catalyst activity and polymer productivity.

The dialkylzinc compound, the partially activated or totally unactivated precursor composition, and the required amount of activator compound necessary to complete activation of the precursor composition are preferably introduced into the reactor through separate feed lines. The dialkylzinc compound and the activator compound are conveniently and preferably strayed into the reactor dissolved in an inert liquid solvent, i.e., a solvent which is nonreactive with all the components of the catalyst system as well as all the components of the reaction system. Hydrocarbons such as isopentane, hexane, and mineral oil are preferred for this purpose. Generally, such solutions contain from about 2 weight percent to about 30 weight percent of the activator compound and/or the dialkylzinc compound. If desired, less concentrated or more concentrated solutions can be employed, or, alternatively, the activator compound and the dialkylzinc compound can be added in the absence of solvent, or, if desired, suspended in a stream of liquid monomer.

Any solvent employed to introduce the dialkylzinc compound and the activator compound into the reactor is, of course, immediately vaporized in the reactor so that gaseous conditions are maintained in the reactor at all times. The amount of solvent employed should, of course, be carefully controlled so as to avoid the use of excessive quantities of liquid which would prevent the rapid vaporization thereof.

The activator compound should be added to the reactor in such amounts as to provide, in the reactor, a total aluminum:titanium atomic ratio of from about 10:1 to about 400:1, preferably from about 25:1 to about 60:1.

The dialkylzinc compound should be added to the reactor in such amounts as to provide an atomic ratio of zinc:titanium of from about 3:1 to about 40:1, preferably from about 5:1 to about 25:1.

By operating under the polymerization conditions described herein it is possible to continuously polymerize ethylene in a fluidized bed with one or more higher alpha olefins containing from 3 to 8 carbon atoms to produce low molecular weight copolymers having a melt index of from about 500 g/10 minutes to about 2500 g/10 minutes. By "continuously polymerize" as used herein is meant the capability of uninterrupted polymerization for weeks at a time, i.e., at least in excess of 168 hours, and usually in excess of 1000 hours without reactor fouling due to the production of large agglomerations of polymer.

The low molecular weight ethylene copolymers produced in accordance with the process of the present invention usually have a density of from 0.88 g/cm$^3$ to 0.96 g/cm$^3$. Such copolymers contain from 54 mol percent to 94 mol percent of polymerized ethylene and from 6 mol percent to 46 mol percent of polymerized alpha-olefin containing from 3 to 8 carbon atoms.

The low molecular weight copolymers produced in accordance with the present invention have a weight average molecular weight ($M_w$) of from about 2,000 to about 14,000 and a number average molecular weight ($M_n$) of from about 1,000 to about 7,000. The molecular weight distribution ($M_w/M_n$) of such copolymers, defined as the ratio of weight average molecular weight to number average molecular weight, may vary from about 1.5 to about 3.0, usually from about 1.7 to about 2.5.

The low molecular weight ethylene copolymers produced in accordance with the process of the present invention have a melt index of from about 500 g/10 minutes to about 2500 g/10 minutes, preferably of from about 500 g,10 minutes to about 2000 g/10 minutes. The melt index of a polymer varies inversely with its molecular weight and is a function of the hydrogen/monomer ratio employed in the reaction system, the amount of dialkylzinc present, the polymerization temperature, and the density of the polymer. Thus, the melt index is raised by increasing the hydrogen/monomer ratio, the concentration of dialkylzinc, the polymerization temperature, and/or the ratio of higher alpha-olefin to ethylene employed in the reaction system.

The low molecular weight copolymers produced in accordance with the present invention have a melting point of from about 110° C. to about 145° C.

The low molecular weight copolymers produced in accordance with the present invention have a residual catalyst (precursor) content of less than 0.05 weight percent. The residual titanium content of such copolymers is less than 4 parts per million (ppm), usually from 2 to 3 parts per million (ppm). When produced in the absence of dialkylzinc compound, such copolymers have a residual catalyst (precursor) content of at least 0.05 weight percent up to about 0.20 weight percent. The residual titanium content of such copolymers is from about 4 to 15 parts per million (ppm), usually from about 4 to 8 parts per million (ppm).

The low molecular weight ethylene copolymers produced in accordance with the present invention are granular materials having an average particle size of from about 0.01 to about 0.07 inches, usually of from about 0.02 to about 0.05 inches, in diameter. Particle size is important for the purpose of readily fluidizing the polymer particles in the fluid bed reactor.

The ethylene polymers produced in accordance with the process of the present invention have a bulk density of from about 16 pounds per cubic foot to about 25 pounds per cubic foot.

The following Examples are designed to illustrate the present invention and are not intended as a limitation upon the scope thereof.

The properties of the polymers described herein were determined by the following test methods:

Density

ASTM D-1505. A plaque is made and conditioned for one hour at 100° C. to approach equilibrium crystallinity. Measurement for density is then made in a density gradient column and density values are reported as grams/cm$^3$.

MELT INDEX (MI)

Determined at 190° C. for polymers having a melt index of less than 1000 grams per 10 minutes by applying a weight load of 2050 grams to the sample and counting the number of seconds required for the molten polymer to flow one inch through a die having a diameter of 0.041±0.002 inch and a height of 0.157±0.002 inch. Melt index was then calculated according to the equation:

$$MI = \frac{K}{T}$$

where T is the time in seconds and K is a constant determined from a polymer of known melt index.

The melt index of polymers having a melt index of greater than 1,000 grams per 10 minutes is determined in a similar manner at 125° C. using a weight load of 225 grams.

Fines

Weight percent of polymer particles which pass through a 120 mesh screen.

Rubble

Weight percent of polymer particles which are collected on a 10 mesh screen.

Productivity

A sample of the resin product is ashed, and the weight percent of ash is determined. The amount of Ti, Mg and halide in the ash is determined by elemental analysis. Productivity is expressed in terms of pounds of polymer produced per pound of catalyst (precursor) consumed and/or parts per million of Ti in the polymer.

Average Particle Size

Calculated from sieve analysis data according to ASTM D-1921, Method A, using a 500 g sample. Calculations are based on weight fractions retained on the screens.

Bulk Density

ASTM D-1895, Method B The resin is poured via 3/8" diameter funnel into a 400 ml graduated cylinder to the 400 ml line without shaking the cylinder, and weighed by difference.

EXAMPLE 1

Impregnation of Support with Precursor

In a 12 liter flask equipped with a mechanical stirrer were placed 41.8g (0.439 mol) of anhydrous $MgCl_2$ and 2.5 liters of tetrahydrofuran (THF). To this mixture, 29.0g (0.146 mol) of $TiCl_3 \cdot 0.33\ AlCl_3$ were added, and the resulting slurry was heated at 60° C. for ½ hour in order to completely dissolve the magnesium and titanium compounds.

Five hundred grams (500 g) of silica were dehydrated by heating at a temperature of 600° C. and slurried in 3 liters of isopentane. The slurry was stirred while 186 ml. of a 20 percent by weight solution of triethylaluminum in hexane was added thereto over a ¼ hour period. The resulting mixture was then dried under a nitrogen purge at 60° C. over a period of about 4 hours to provide a dry, free-flowing powder containing 5.5 percent by weight triethylaluminum.

The treated silica was then added to the solution prepared as described above. The resulting slurry was stirred for ¼ hour and then dried under a nitrogen purge at 60° C. over a period of about 4 hours to provide a dry, impregnated, free-flowing powder containing about 9 percent THF.

EXAMPLE 2

Preparation of Partially Activated Precursor

The silica-impregnated precursor composition prepared in accordance with Example 1 was slurried in 3 liters of anhydrous isopentane and stirred while a 20 percent by weight solution of tri-n-hexylaluminum in anhydrous hexane was added thereto over a ¼ hour period. The tri-n-hexyl(aluminum solution was employed in an amount sufficient to provide 0.2 mols of this compound per mol of tetrahydrofuran in the precursor. The mixture was then dried under a nitrogen purge at a temperature of 65±10° C. over a period of about 4 hours to provide a dry, free-flowing powder. This material was stored under dry nitrogen until it was needed.

Comparative Example A

The silica-impregnated precursor composition prepared in accordance with Example 1 and partially activated in accordance with Example 2 was employed together with triethylaluminum, as cocatalyst, to copolymerize ethylene with hexene-1 in the presence of 4.4 mol percent hydrogen in a fluidized bed reactor system similar to the one described and illustrated in U.S. Pat. Nos. 4,302,565 and 4,302,566. The polymerization reactor had a lower section 10 feet high and 18 inches in diameter, and an upper section 12.5 feet high and 30 inches in diameter.

The silica-impregnated precursor composition was continually fed to the polymerization reactor along with a 5 percent solution of tri-triethylaluminum in isopentane so as to provide a completely activated catalyst in the reactor having an aluminum:titanium atomic ratio of about 45:1.

Polymerization was effected at a pressure of 2068 kPa and a temperature of 86° C. using a gaseous reaction mixture containing 30.5 mol percent ethylene, 2.5 mol percent hexene-1, 4.4 mol percent hydrogen, and about 55.5 mol percent nitrogen. The gaseous mixture was passed through the bed at a superficial gas velocity of about 1.8 ft/sec.

Table 1 below summarizes the reaction conditions employed in this polymerization, the properties of the copolymer produced by such polymerization under steady state conditions, and the productivity of the catalyst system employed.

Comparative Example B

Ethylene was copolymerized with hexene-1 in the presence of 33.3 mol percent hydrogen using the same fluidized bed reactor system and catalyst system employed in Comparative Example A.

Polymerization was effected at a pressure of 2068 kPa and a temperature of 100° C. using a gaseous reaction mixture containing 33.3 mol percent ethylene, 1.7 mol percent hexene-1, 33.3 mol percent hydrogen, and 25.0 mol percent nitrogen. The gaseous mixture was passed through the bed at a superficial gas velocity of about 1.8 ft/sec.

After steady state conditions were attained, the copolymer being produced had a melt index of 140 g/10 minutes compared to 0.5 g/10 minutes in Comparative Example A. The titanium content of the copolymer was 3.60 ppm compared to 3.32 ppm in Comparative Example A. The conditions attained at that time are set forth in Comparative Example B of Table 1.

Comparative Example C

A 5 percent by weight solution of diethylzinc in isopentane was continually added to the reaction mixture of Comparative Example B over a 20 hour period until the atomic ratio of zinc:titanium in the reactor reached a ratio of 6:1 and the conditions shown in Comparative Example C of Table 1 were attained. At the end of the 20 hour period, the copolymer being produced had a melt index of 302 g/10 min. compared to 140 g/10 min. in Comparative Example B. The titanium content of the copolymer was 2.71 ppm compared to 3.60 ppm in Comparative Example B.

EXAMPLE 3

The composition of the gaseous reaction mixture of Comparative Example C was altered over a period of 4 days until the mixture contained 47.9 mol percent hydrogen and the atomic ratio of zinc:titanium in the reactor reached a ratio of 21:1.

After steady state conditions were attained, the copolymer being produced had a melt index of 930 g/10 min. compared to 302 g/10 min. in Comparative Example C. Despite the presence of almost 12 percent more hydrogen in the reactor, the copolymer had a titanium content of 2.37 ppm compared to 2.71 ppm in Comparative Example C. The conditions attained at that time are set forth in Example 3 of Table 1.

TABLE 1

| Example | Comp. Exp. A | Comp. Exp. B | Comp. Exp. C | Exp. 3 |
|---|---|---|---|---|
| Polymerization Conditions | | | | |
| Temperature, °C. | 86 | 100 | 100 | 100 |
| Pressure, kPa | 2068 | 2068 | 2068 | 2068 |
| Al/Ti Atomic Ratio | 45 | 72 | 75 | 74 |
| Zn/Ti Atomic Ratio | 0 | 0 | 6 | 21 |
| Space-Time Yield (lb/hr/ft$^3$) | 4 | 5 | 4 | 7 |
| Mol % Hydrogen | 4.4 | 33.3 | 36.0 | 47.9 |
| Mol % Nitrogen | ~55.5 | 25.0 | 27.0 | 10.0 |
| Mol % Ethylene | 30.5 | 33.3 | 34.3 | 34.0 |
| Mol % Hexene | 2.5 | 1.7 | 1.7 | 2.0 |
| Hydrogen/Ethylene Mol Ratio | 0.14 | 1.00 | 1.05 | 1.41 |
| Hexene/Ethylene Mol Ratio | 0.08 | 0.05 | 0.05 | 0.06 |
| Polymer Properties | | | | |
| Melt Index, g/10 min | 0.5 | 140 | 302 | 930 |
| Density, gm/cc | 0.930 | 0.948 | 0.945 | 0.946 |
| Bulk Density, lbs/ft$^3$ | 27.0 | 23.0 | 21.2 | 19.7 |
| Avg. Particle Size, in | 0.030 | 0.013 | 0.011 | 0.012 |
| Fines, % | 1.2 | 8.3 | 7.9 | 4.0 |
| Rubble, % | 0 | 0 | 0 | 0 |
| Productivity | | | | |
| Lbs Polymer/Lb Catalyst | 3010 | 2780 | 3690 | 4220 |
| Ti, ppm. | 3.32 | 3.60 | 2.71 | 2.37 |

We claim:

1. A continuous process for producing ethylene copolymers having a melt index of from g/10 minutes to 2500 g/10 minutes which comprises copolymerizing ethylene and at least one higher alpha-olefin, by continuously contacting, in a fluidized bed, at a temperature of from 10° C. up to 110° C. and a pressure no greater than 7,000 kPa, a gaseous mixture containing (a) ethylene and at least one higher alpha-olefin containing from 3 to 8 carbon atoms in a molar ratio of such higher alpha-olefin to ethylene of from 0.01:1 to 2 1, and (b) from 30 mol percent to 90 mol percent hydrogen, with (I) particles of a catalyst system comprising a precursor composition having the formula $Mg_mTi(OR'')_nX_p[ED]_q$ wherein R'' is an aliphatic or aromatic hydrocarbon radical containing from 1 to 14 carbon atoms, or COR''' wherein R''' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic carboxylic acids, aliphatic ethers, cycloaliphatic ethers and aliphatic ketones, m is 0.5 to 56, n is 0, 1 or 2, p is 2 to 116, and q is 2 to 85, said precursor composition being diluted with an inert carrier material and completely activated with an organoaluminum compound having the formula $Al(R'''')_dX'_eH_f$ wherein X' is Cl or OR''''', R'''' and R''''' are saturated hydrocarbon radicals containing from 1 to 14 carbon atoms, e is 0 to 1.5, f is 0 or 1, and d+e+f=3, said activator compound being employed in an amount such as to provide a total aluminum:titanium atomic ratio in the fluidized bed of from 10:1 to 400:1; and (II) a dialkylzinc compound having the formula $ZnRR'$ wherein R and R' are alkyl radicals containing from 1 to 12 carbon atoms, said dialkylzinc compound being employed in an amount such as to provide an atomic ratio of zinc:titanium of from 3:1 to 40:1.

2. A process as in claim 1 wherein the precursor composition is mechanically mixed with the inert carrier material and the blended mixture contains from 3 percent by weight to 50 percent by weight of the precursor composition.

3. A process as in claim 1 wherein the inert carrier material is impregnated with the precursor composition and the impregnated carrier material contains from 3 percent by weight to 50 percent by weight of the precursor composition.

4. A process as in claim 3 wherein the gaseous mixture contains from 40 mol percent to 75 mol percent hydrogen.

5. A process as in claim 4 wherein the dialkylzinc compound is diethylzinc.

6. A process as in claim 4 wherein the molar ratio of hydrogen to ethylene in the gaseous mixture is from 2.5:1 to 18:1.

7. A process as in claim 6 wherein the dialkylzinc compound is diethylzinc.

8. A process as in claim 3 wherein the precursor composition is partially activated with the organoaluminum compound before it is introduced into the polymerization reactor, said organoaluminum compound being employed in an amount sufficient to provide the precursor composition with a molar ratio of organoaluminum compound:electron donor compound of up to 0.5:1.

9. A process as in claim 8 wherein R and R' are alkyl radicals containing from 1 to 6 carbon atoms.

10. A process as in claim 9 wherein the molar ratio of higher alpha-olefin to ethylene in the gaseous mixture is from 0.05:1 to 1:1.

11. A process as in claim 10 wherein the gaseous mixture contains from 40 mol percent to 60 mol percent hydrogen.

12. A process as in claim 11 wherein the dialkylzinc compound is diethylzinc.

13. A process as in claim 11 wherein the molar ratio of hydrogen to ethylene in the gaseous mixture is from 3.5:1 to 11:1.

14. A process as in claim 13 wherein the dialkylzinc compound is diethylzinc.

15. A process as in claim 13 wherein the polymerization temperature is from 10° C. to 100° C.

16. A process as in claim 15 wherein the dialkylzinc compound is diethylzinc.

17. A process as in claim 3 wherein the precursor composition is partially activated with the organoaluminum compound before it is introduced into the polymerization reactor, said organoaluminum compound being employed in an amount sufficient to provide the precursor composition with a molar ratio of organoaluminum compound:elector donor compound of from 0.1:1 to 0.3:1.

18. A process as in claim 17 wherein R and R' are alkyl radicals containing from 1 to 6 carbon atoms.

19. A process as in claim 18 wherein the molar ratio of higher alpha-olefin to ethylene in the gaseous mixture is from 0.05:1 to 1:1.

20. A process as in claim 19 wherein the gaseous mixture contains from 40 mol percent to 60 mol percent hydrogen.

21. A process as in claim 20 wherein the dialkylzinc compound is diethylzinc.

22. A process as in claim 20 wherein the molar ratio of hydrogen to ethylene in the gaseous mixture is from 3.5:1 to 11:1.

23. A process as in claim 22 wherein the dialkylzinc compound is diethylzinc.

24. A process as in claim 22 wherein the polymerization temperature is from 10° C. to 100° C.

25. A process as in claim 24 wherein the dialkylzinc compound is diethylzinc.

26. A process as in claim 17 wherein the atomic ratio of zinc:titanium s from 5:1 to 25:1.

27. A process as in claim 26 wherein R and R' are alkyl radicals containing from 1 to 6 carbon atoms.

28. A process as in claim 27 wherein the molar ratio of higher alpha-olefin to ethylene in the gaseous mixture is from 0.05:1 to 1:1.

29. A process as in claim 28 wherein the gaseous mixture contains from 40 mol percent to 60 mol percent hydrogen.

30. A process as in claim 29 wherein the dialkylzinc compound is diethylzinc.

31. A process as in claim 29 wherein the molar ratio of hydrogen to ethylene in the gaseous mixture is from 3.5:1 to 11:1.

32. A process as in claim 31 wherein the dialkylzinc compound is diethylzinc.

33. A process as in claim 31 wherein the polymerization temperature is from 10° C. to 100° C.

34. A process as in claim 33 wherein the dialkylzinc compound is diethylzinc.

35. A process as in claim 26 wherein the precursor composition is prepared with $TiCl_3$ and $MgCl_2$.

36. A process as in claim 27 wherein the precursor composition is prepared with $TiCl_3$ and $MgCl_2$.

37. A process as in claim 28 wherein the precursor composition is prepared with $TiCl_3$ and $MgCl_2$.

38. A process as in claim 29 wherein the precursor composition is prepared with $TiCl_3$ and $MgCl_2$.

39. A process as in claim 30 wherein the precursor composition is prepared with $TiCl_3$ and $MgCl_2$.

40. A process as in claim 31 wherein the precursor composition is prepared with $TiCl_3$ and $MgCl_2$.

41. A process as in claim 32 wherein the precursor composition is prepared with $TiCl_3$ and $MgCl_2$.

42. A process as in claim 33 wherein the precursor composition is prepared with $TiCl_3$ and $MgCl_2$.

43. A process as in claim 34 wherein the precursor composition is prepared with $TiCl_3$ and $MgCl_2$.

44. A process as in claim 35 wherein the precursor composition is partially activated with tri-n-hexylaluminum.

45. A process as in claim 36 wherein the precursor composition is partially activated with tri-n-hexylaluminum.

46. A process as in claim 37 wherein the precursor composition is partially activated with tri-n-hexylaluminum.

47. A process as in claim 38 wherein the precursor composition is partially activated with tri-n-hexylaluminum.

48. A process as in claim 39 wherein the precursor composition is partially activated with tri-n-hexylaluminum.

49. A process as in claim 40 wherein the precursor composition is partially activated with tri-n-hexylaluminum.

50. A process as in claim 41 wherein the precursor composition is partially activated with tri-n-hexylaluminum.

51. A process as in claim 42 wherein the precursor composition is partially activated with tri-n-hexylaluminum.

52. A process as in claim 43 wherein the precursor composition is partially activated with tri-n-hexylaluminum.

53. A process as in claim 44 wherein ethylene is copolymerized with hexene-1.

54. A process as in claim 45 wherein ethylene is copolymerized with hexene-1.

55. A process as in claim 46 wherein ethylene is copolymerized with hexene-1.

56. A process as in claim 47 wherein ethylene is copolymerized with hexene-1.

57. A process as in claim 48 wherein ethylene is copolymerized with hexene-1.

58. A process as in claim 48 wherein ethylene is copolymerized with hexene-1.

59. A process as in claim 50 wherein ethylene is copolymerized with hexene-1.

60. A process as in claim 51 wherein ethylene is copolymerized with hexene-1.

61. A process as in claim 52 wherein ethylene is copolymerized with hexene-1.

* * * * *